(12) United States Patent
Niccolini et al.

(10) Patent No.: US 8,442,908 B2
(45) Date of Patent: May 14, 2013

(54) SYSTEMS AND METHODS FOR ASSET VALUATION

(75) Inventors: Michael Niccolini, Baltimore, MD (US); Kevin Kirkbride, Washington, DC (US); James Jedediah Williams, Boyds, MD (US); Walter Hancock, Leesburg, VA (US); William L. Newcomb, Washington, DC (US)

(73) Assignee: MCMCAP Partners, LLC, Bethesda, MD (US)

( * ) Notice: Subject to any disclaimer, the term of this patent is extended or adjusted under 35 U.S.C. 154(b) by 131 days.

(21) Appl. No.: 12/813,657

(22) Filed: Jun. 11, 2010

(65) Prior Publication Data

US 2010/0318451 A1 Dec. 16, 2010

Related U.S. Application Data

(60) Provisional application No. 61/186,687, filed on Jun. 12, 2009.

(51) Int. Cl.
*G06Q 40/00* (2006.01)
(52) U.S. Cl.
USPC .............................. 705/38; 705/35
(58) Field of Classification Search ............ 705/38, 705/35
See application file for complete search history.

(56) References Cited

U.S. PATENT DOCUMENTS

| | | | | |
|---|---|---|---|---|
| 7,711,574 B1* | 5/2010 | Bradley et al. | ............... | 705/306 |
| 7,788,186 B1* | 8/2010 | An et al. | ................ | 705/306 |
| 7,822,691 B1* | 10/2010 | Kuo | ............................ | 705/313 |
| 7,885,891 B1* | 2/2011 | Washington et al. | ........... | 705/38 |
| 2003/0018558 A1* | 1/2003 | Heffner et al. | .................. | 705/37 |
| 2003/0046211 A1* | 3/2003 | Brecher | ......................... | 705/36 |
| 2005/0171822 A1* | 8/2005 | Cagan | .............................. | 705/7 |
| 2005/0216384 A1* | 9/2005 | Partlow et al. | .................. | 705/35 |
| 2005/0278246 A1* | 12/2005 | Friedman et al. | .............. | 705/38 |
| 2007/0244780 A1* | 10/2007 | Liu | ................................ | 705/35 |
| 2007/0288362 A1* | 12/2007 | Pollock et al. | .................. | 705/38 |
| 2008/0046353 A1* | 2/2008 | Poltorak et al. | ................. | 705/37 |
| 2010/0106554 A1* | 4/2010 | Dahiwadkar | .................... | 705/9 |
| 2010/0179911 A1* | 7/2010 | Gorina et al. | ................. | 705/306 |

* cited by examiner

*Primary Examiner* — Gregory Johnson
(74) *Attorney, Agent, or Firm* — Patton Boggs LLP

(57) ABSTRACT

Systems and methods for asset valuation, whole loan processing and inventory management is described. The systems and methods may include modules. An asset valuation tool may use multiple data sources for producing current and predicted future values and historical and intermediate data points on a requested timeline. A loan information pricing tool may perform unlimited volumes of loan program eligibility and multi-variable pricings on a user desktop. A workout activity tracking tool may capture, monitor, measure and report on a loan workout process including direct hosting and integration of the asset valuation tool and the loan information pricing tool. The present invention may offer diverse and competitive modular components as well as an integrated and innovative platform that does not exist in the market.

22 Claims, 10 Drawing Sheets

Current Valuation

- RAPS looks for the index value for a zip code on the origination date, then searches for the index value for the current date for that zip code.
- After the two data points have been established a delta is calculated and then applied to the original appraisal to obtain a valuation

301

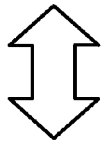

Current Valuations Example

| Zip Code | Orig. Index | Cur. Index | Δ | Orig. Value | Value |
|---|---|---|---|---|---|
| 20009 | 105.52 | 91.65 | -14% | $500,000 | $432,277 |
| 22902 | 92.35 | 75.89 | -18% | $375,000 | $308,161 |
| 01562 | 195.95 | 149.18 | -24% | $1,952,652 | $1,486,587 |
| 85923 | 201.59 | 192.98 | -5% | $895,800 | $857,540 |

303

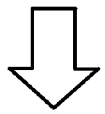

Future Valuation

- For assets with futures data, the future index and the current index can be connected mathematically using statistical methods giving more weight to the future contract the closer it is.
- For assets without futures data, strong directional relationships may be identified between Case-Shiller indices with futures data. The Case-Shiller index may be used as an independent variable and may help to predict other indices without futures data.
- For assets with no futures information and no suitable relationship for a regression analysis, various moving average trend equations may be performed to predict future valuations.
- Predictive valuations can be made up to 12 months or more from the current date.

Actual Appraisals and Index Adjusting

- Even after zip code level indices are established, the system may constantly adapt to changing markets.
- When an actual appraisal is received, it may be logged into the system.
- The system may verify the zip code and determine how accurate the initial prediction was. Depending on the significance of the error and how many appraisals have been logged in that particular zip code, the logged appraisals may manipulate that zip code's index to reflect current market conditions.
- In this respect, the system may continuously become more accurate with each actual appraisal data point received.

401

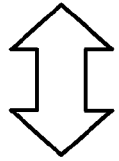

Confidence Levels

- Depending on the number of data points in a particular zip code, confidence in estimated valuations may vary.
- A confidence score may be applied to each valuation on a scale. A high confidence score may mean that there are either an abundance of appraisals in that area or that the system has been extremely accurate in past predictions for this area.

| POOL | PHASE | INPUTS | PREP | ANALYTICAL LOOP | | | | MODELS | ACTIONS | | | | OUTPUTS |
|---|---|---|---|---|---|---|---|---|---|---|---|---|---|
| Pool-A | Phase-1 | Bank Tape | Crack Tape | RAPS | LIPS Scenario Generator | LIPS | LIPS Output Control | Incentive Test & Exit Adj | Financial Model | Bid | Bid Response | Order DD | DD 1\|2\|3\|4\|5\|6\|7\|8 | Due Diligence Tape |
| | | | | | Alternative Exits | | | | | | | | |
| | Phase-2 | Due Diligence Tape | | RAPS | LIPS Scenario Generator | LIPS | LIPS Output Control | Incentive Test & Exit Adj | Risk Rating Model | Property Value | Prop Cond & Marketability | Credit Inc, Occ & General | Severity | Risk Rating-1 Tape (Rating & Findings) |
| | | | | | Alternative Exits | | | | | | | | |
| | Phase-3 | Risk Rating-1 Tape | | RAPS | LIPS Scenario Generator | LIPS | LIPS Output Control | Incentive Test & Exit Adj | Risk Rating Model | Retail Exit Review | | Alternative Exit Review | | RR-2 Tape (Final Exit Levels) |
| | | | | | Alternative Exits | | | | | | | | |
| | Phase-4 | Cutoff Tape | Draft | Loan Selection | Exit Selection | Loan Pricing | Contract Loan List & Pricing | Funding | Funding Schedule | Partner Assignments | Baseline Tape | Partner LOs & New Loan IDs | Cutoff Tape | WATS Tape |

FIG. 8A

SYSTEMS AND METHODS FOR ASSET VALUATION

CROSS-REFERENCE TO RELATED APPLICATION

This application claims priority to U.S. Provisional Patent Application No. 61/186,687, filed Jun. 12, 2009; the content of which is incorporated herein by reference in their entirety.

FIELD OF THE INVENTION

The present invention relates to financial systems and, more specifically, to systems and methods for value-added analysis, administration and execution of asset valuation, whole loan pricing and inventory management. The present invention offers various modular components as well as an integrated platform.

BACKGROUND OF THE INVENTION

Many businesses operate in the residential mortgage industry. Types of entities that operate in the residential mortgage industry include buyers, sellers, brokers, lenders, credit agencies, valuation and appraisal firms, title and insurance firms, financial facilitators, loan servicers, trustees and countless other intermediaries.

Mortgage origination, sales and trading are not new businesses. There are, however, many difficulties and inefficiencies in the market in its current state. Conducting due diligence on a single loan, valuing a single property, and evaluating the borrower(s) ability and willingness to reliably pay the mortgage for a property are very labor intensive, technically complex, multi-step processes. Administering a business that executes these steps thousands of times in parallel, while simultaneously monitoring and reporting progress to stakeholders and investors, requires technological and business process innovation, is a multi-dimensional challenge of time, effort, information, analysis and resources.

There are existing technologies that address scaling of specific steps and functions in the mortgage industry. There are organizations that work in some or multiple industry segments. The business processes and technologies that exist, however, are limited in several respects. Most processes and technologies lack the ability to value individual loans by specific investment exits, scale operations without sacrificing transaction speed or consistency of service, and/or track progress of each borrower and related mortgage at various stages of the overall process. Current processes and technologies are further limited in their ability to evaluate large pools of mortgages in terms of current and expected future market value. There is currently no universally accepted valuation method. Banks are understandably hesitant to make a loan secured by an asset that may deteriorate in value below acceptable standards. Investors may wait on the sideline holding cash because they are unable to determine a price that banks and mortgage owners will accept, but which also provides adequate returns to facilitate investment of financial and intellectual capital. Investors are also uncertain as to which available retail refinance and hold strategies maximize investment yields while minimizing negative effects to borrower credit or asset value deterioration. Additionally, borrowers are unsure which modification or subsidy programs will prevail in the market, and are consequently unsure whether to continue making mortgage payments or not. Industry limitations are increasing obvious when reviewing daily news reports noting how the world's leading financial firms and government agencies struggle to determine values and optimal strategies for mitigating losses and maximizing the value of large mortgage asset portfolios.

Property Valuation: For property valuations, appraisal and brokerage firms search for listing and sales price comparables. The most common forms these analyses take is that of an Automated Valuation Model (AVM), or a Broker Price Opinion (BPO). Both forms require street address level data.

The most relied upon index that tracks home price valuation trends is the Case-Shiller index, which is only valid for 40% of the United States by geographic area. It excludes new construction, only incorporates single family homes (not condos or other home types), and has several other limitations that make it impossible to rely on it exclusively as a proxy for homes price trends nationwide.

Some leading appraisal use or apply some combination of market comparables and appraiser expertise, with desktop underwriting (DU) and AVM. Many companies have some version of an AVM, but they often use data that is very broad and does not return a reliable estimate of value. Limitations of these models are similar to Case-Shiller in that they do not include enough data to produce market specific valuations. For instance, the Federal Housing Finance Agency (FHFA), formerly known as the Office of Federal Housing Enterprise Oversight (OFHEO), has a house price calculator on its website that requires only the state or MSA (Metropolitan Statistical Area), purchase calendar quarter, valuation quarter, and purchase price to return a value estimate. So, for example, data from Baltimore could influence the value of a subject home in Georgetown, a Washington, D.C. neighborhood, because the data is only MSA specific at best, which includes data from Baltimore and Georgetown, among other areas. AVMs require the analyst to select input data which introduces a high degree of variability. These valuations ostensibly take into account the property's level of finishes, amenities, location, size, age of appliances and other factors to provide some proxy of a comparable price per square foot, which can then be applied to the subject property to estimate a value range. Each lacks a realistic incorporation of market valuation trends over time, and further lack any indication as to future value based on moving averages and sales and supply/demand trends or home price indexes and futures markets which incorporate some of these influences.

BPOs require a person to travel to a property, observe and make note of appearance and property condition, occupancy, neighborhood characteristics, and other on site data as well as compare available public information about the subject property to market comparable data to estimate a value for the property. Limitations of this approach are that the evaluations are subject to human error and interpretation as well as the approach becomes unwieldy when evaluating thousands of properties in a matter of days.

Mortgage Asset Valuation: For mortgage pool valuations, the federal government, private banks and investors value mortgage pools generally use aggregate pool characteristics, taking, for example, weighted average coupon figures, general borrower credit characteristics, broadly assigning risk weightings or expected cash flow probabilities by risk level. These organizations then discount cash flows to present value using some weighted average cost of capital as the discount rate, and adjust the purchase price to back into an acceptable level of return. This approach to valuing mortgage pools is inaccurate and unreliable. Consequently, limited trading occurs because investors do not have sufficient confidence in this model. A negative feedback loop results where the markets become more illiquid, and the assets become more difficult to value for market stakeholders, which in turn makes the markets even more illiquid, etc.

Evaluating Exits: Mortgage owners and investors take a narrow approach in evaluating mortgage investment exit options. Banks at some point switched from a "lend and hold the loan on balance sheet" to a "lend, pool and securitize model". Banks prefer the quick fees associated with mortgage origination over the lower yielding, but relatively predictable, interest income from holding the loans to maturity. Investors currently gravitate to one of three main mortgage loan strategies: 1) flip the loans to a higher bidder, 2) foreclose and sell the asset, 3) hold the loans to maturity or until the value recovers and then flip the loans.

Needs exist for improved systems and methods for asset valuation, whole loan pricing and inventory management of increasingly complex portfolios of diverse products, as well as analysis and processes to maximize value.

SUMMARY OF THE INVENTION

Embodiments of the present invention solve many of the problems and/or overcome many of the drawbacks and disadvantages of the prior art by providing systems and methods for asset valuation, whole loan pricing and inventory management. While each embodiment may be used as a stand-alone system and method, they may also share a common integrated platform for increased visibility and efficiency.

Embodiments of the present invention may include a process for asset valuation. A query may be received from a user regarding an asset for valuation. Data related to the asset may be accessed from a plurality of data sources. The data may include at least a first index value for the asset, a second index value for the asset, and a first valuation value. An index of monthly value percentage changes may be calculated from the first index value for the asset and the second index value for the asset. The index of monthly value percentage changes may then be applied to the first valuation value to create an estimated valuation value. The estimated valuation value may be presented to the user responsive to the query.

Embodiments of the present invention may also include a system for loan pricing. A processor may interface interfacing with one or more third party servers, interface with a plurality of databases in communication with the one or more third party servers, and interface with one or more client devices. The processor may format a pool of loans and provide a plurality of parameters for loan pricing to the one or more client devices before receiving a selection from the one or more client devices of one or more of the plurality of parameters. The processor may process the pool of loans based upon the one more of the plurality of parameters; and provide loan pricing for the pool of loans to the one or more client devices.

Embodiments of the present invention may also include a system for tracking a loan workout process. A processor may interface with one or more client devices and interface with one or more vendor systems. The processor may accept a query from the one or more client devices regarding the loan workout and track the status of the loan workout. The processor may receive input from the vendor systems regarding the status of the loan workout and update the status of the loan workout based upon the input from the vendors. The processor may provide logical controls to prevent mistakes during the loan workout, and report the status for the loan workout to the one or more client devices in response to the query.

Embodiments of the present invention may also include systems and methods for asset valuation, whole loan processing and inventory management. The systems and methods may include modules. An asset valuation tool may use multiple data sources for producing current and predicted future values and historical and intermediate data points on a requested timeline. A loan information pricing tool may perform unlimited volumes of loan program eligibility and multi-variable pricings on a user desktop. A workout activity tracking tool may capture, monitor, measure and report on a loan workout process including direct hosting and integration of the asset valuation tool and the loan information pricing tool. The present invention may offer diverse and competitive modular components as well as an integrated and innovative platform that does not exist in the market.

Additional features, advantages, and embodiments of the invention are set forth or apparent from consideration of the following detailed description, drawings and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings:

FIG. 3 shows a process for current and future valuations.

FIG. 4 shows a process for index adjustments and determining confidence levels.

FIG. 8A is an analytical process diagram for an exemplary workflow.

DETAILED DESCRIPTION OF THE PREFERRED EMBODIMENTS

Systems and methods are described for asset valuation, whole loan pricing and inventory management, both separately and as an integrated service platform. Although not required, the systems and methods are described in the general context of computer program instructions executed by one or more computing devices. Computing devices typically include one or more processors coupled to data storage for computer program modules and data. Key technologies include, but are not limited to, the multi-industry standards of 32-bit and 64-bit Microsoft Operating Systems, SQL Server, .NET Framework (VB.NET, ASP.NET, AJAX.NET, JAVA, C#, etc.), Oracle database BIEE products, other e-Commerce products and computer languages. Such program modules generally include computer program instructions such as queries, routines, programs, tasks, objects, components, winforms, etc., for execution by the at least one processor to perform particular tasks, utilize data, data structures, and/or implement particular abstract data types. While the systems, methods, and apparatus are described in the foregoing context, acts and operations described hereinafter may also be implemented in hardware and virtual hardware environments.

Figure 1:
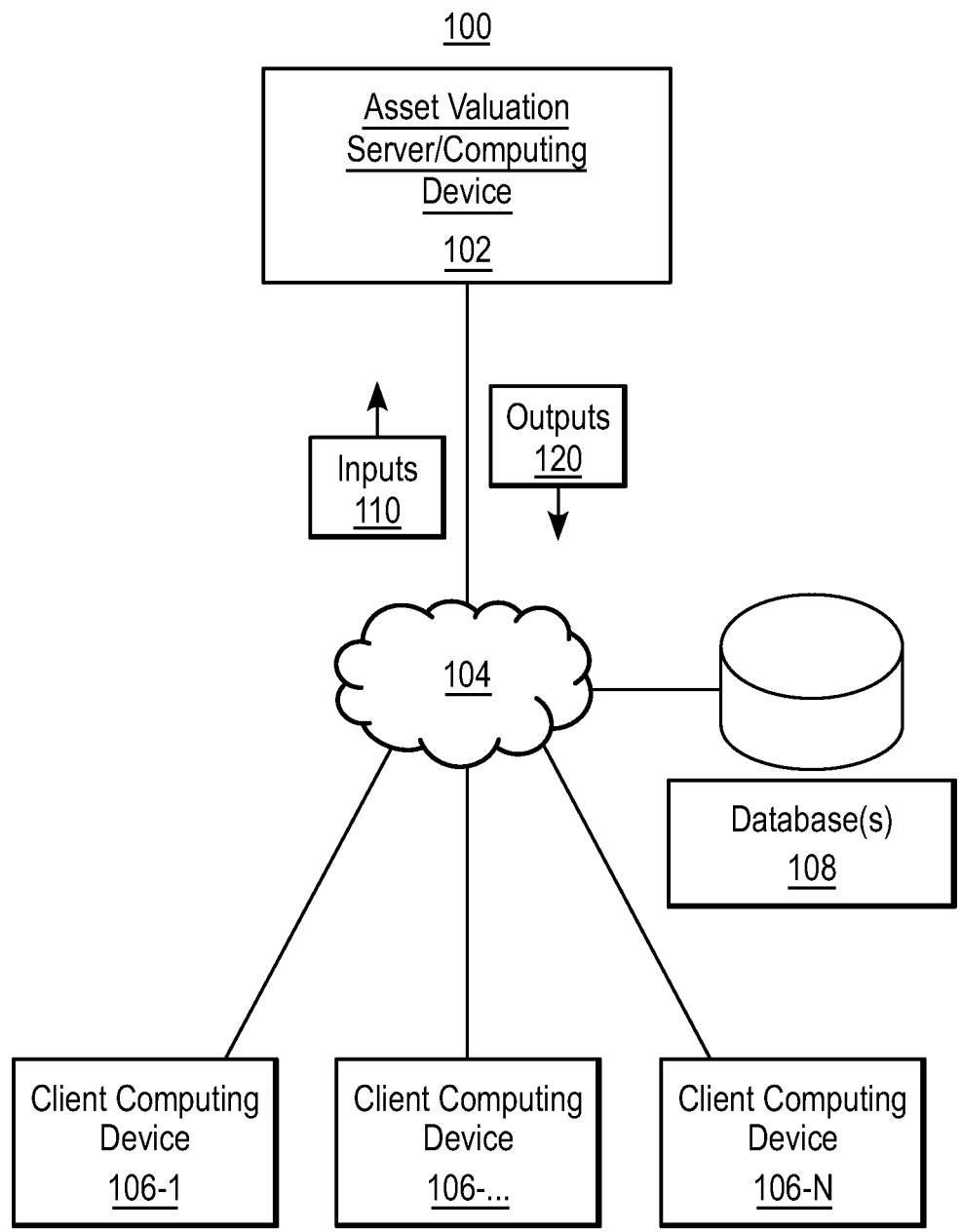
FIG. 1 shows an exemplary system for asset valuation in a networked computing environment.

FIG. 1 shows an exemplary system 100 for asset valuation, according to one embodiment. In this exemplary implementation, system 100 includes asset valuation server/computing device 102 operatively coupled over network 104 to one or more client computing devices 106 (e.g., 106-1 through 106-N) and one or more databases 108. Asset valuation server/computing device 102 represents, for example, any one or more of a server, a general-purpose computing device such as a server, a personal computer (PC), a laptop, and/or so on. Networks 104 represent, for example, any combination of the Internet, local area network(s) such as an intranet, wide area network(s), and/or so on. Such networking environments are commonplace in offices, enterprise-wide computer networks, etc. Client computing devices 106, which may include at least one processor, represent a set of arbitrary computing devices executing application(s) that respectively send data inputs 110 to asset valuation server/computing device 102 and/or receive data outputs 120 from asset valuation server/computing device 102. Such computing devices include, for example, one or more of desktop computers, laptops, mobile computing devices (e.g., PDAs), server computers, and/or so on. In this implementation, the input data comprises, for example, valuation data, market data, index data, third party data, and/or so on, for asset valuation with system 100. In one implementation, the data outputs include, for example, a current valuation, future valuation, and/or so on.

Figure 2:
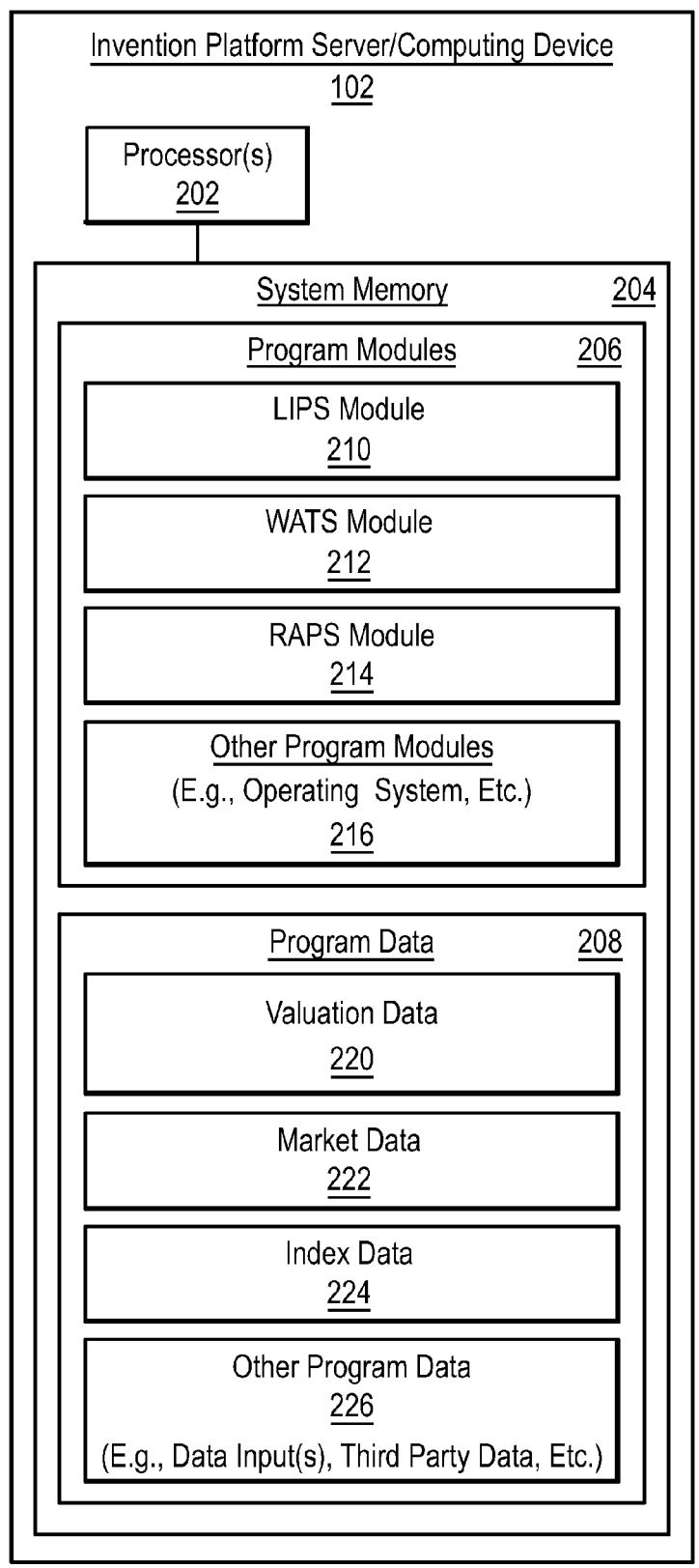
FIG. 2 shows an exemplary server for asset valuation in a networked computing environment.

In this exemplary implementation, server 102 includes at least one processor 202 coupled to a system memory 204, as shown in FIG. 2. System memory 204 includes computer program modules 206 and program data 208. In this implementation program modules 206 include LIPS module 210, WATS module 212, RAPS module 214, and other program modules 216 such as an operating system, device drivers, etc. Each program module 210 through 216 includes a respective set of computer-program instructions executable by processor(s) 202. This is one example of a set of program modules and other numbers and arrangements of program modules are contemplated as a function of the particular arbitrary design and/or architecture of server 102 and/or system 100 (FIG. 1). Additionally, although shown on a single computing device 102, the operations associated with respective computer-program instructions in the program modules 206 could be distributed across multiple computing devices. Program data 208 may include valuation data 220, public and private market data 222, index data 224, and other program data 226 such as data input(s), third-party data, and/or so on.

Residential Asset Pricing System (RAPS)

Exemplary embodiments of the present invention may include a Residential Asset Pricing System (RAPS). The systems and methods of the present invention may be residential property valuation tools that use multiple data sources to generate one or more simultaneous indexes of monthly value percentage changes for one or more residential market segments including but not limited to U.S., foreign, regional, state, county, city, neighborhood, and zip code. Each segment index may be further dissected by one or more residential property attributes including but not limited to single-family homes, condominiums, cooperatives, townhomes, multi-family homes, and manufactured homes. Any of these indices may also be divided along the lines of other select attributes including but not limited to the number of bedrooms, interior size, land size or age. The monthly value percentage changes may then be applied to data in original appraisals from some time in the past to generate a current and projected property value. RAPS may offer users the ability to request property valuations in batches from one to tens of thousands of properties simultaneously. RAPS may use a multiple-point-in-time valuation technique that allows users to request an output value for the property at any point in time forward or backwards. RAPS may use a wholly different process for generating values.

Existing systems use a hedonic methodology for generating values, i.e., they disassemble a property into its constituent characteristics such as number of bedrooms, square footage, location, lot size, and property type. Existing systems then run these characteristics through an additive formula that adds the values. For example, three bedrooms would be worth $25,000; 2,000 sq. ft. would be worth $50,000; the location is worth $75,000; the lot size is worth $25,000; and the fact that it's a town home is worth $50,000. Thus, the entire property is worth $225,000. This is in contrast to the RAPS methodology, which uses a market-relativistic method that takes a known good value for a property at a point in time and ranks it as a percentile of home valuations in that market. RAPS may then track homes at that percentile of value through time to give the value at whatever time period is requested.

Furthermore, RAPS uses different data sets. Existing systems use public record data that can be wrought with errors and is historically 1-6 months behind the current market depending upon the county recording office's backlog in a particular region. RAPS may use public record data that has been scrubbed for inconsistencies and has had data errors removed. RAPS may also use public indexes to track movement over time; private appraisal data; and local economic data, which are not used by existing systems.

The systems and methods of the present invention may incorporate multiple data sources, both public and private, and combinations thereof. The data sources may be variable depending on particular applications. The data sources may include broker price options, actual appraisals, and populations of individual property valuations and estimates. These may include market estimates and other tracking indexes as well as listing and actual property-level transaction data. This may enable the present invention to produce more current estimates, since a reliance on any one data source leads to a time-lag bias since not all data sources are updated and released frequently.

The systems and methods of the present invention may also use futures data from futures and options exchanges for available markets, and apply trend and growth statistical analysis, as shown in FIG. 3. This may provide predictive capabilities to take current values and accelerating or decelerating rates of appreciation or depreciation and estimate future home price values. RAPS may search for an index value for a location at a first date and search for an index value for the current date for that location 301. A delta may be determined based upon an original index and a current index, and applied to the original valuation to obtain an estimated valuation for a location 303. Future valuations may be determined using statistical methods, such as, but not limited to, sliding weighted averages 305. For assets with futures data, the future index and the current index can be connected mathematically using statistical methods, giving more weight to the future contract the closer it is. For assets without futures data, strong directional relationships may be identified between Case-Shiller indices with futures data. The Case-Shiller index may be used as an independent variable and may help to predict other indices without futures data. For assets with no futures information and no suitable relationship for a regression analysis, various moving-average trend equations may be performed to predict future valuations. Predictive valuations can be made up to 12 months or more from the current date. Besides the inherent promise of the creation of a future value, there may be many productive uses of that value. For example, if a loan is made today at a 97% loan to value ratio, but the subject property's market is declining at 2% per month, the loan will be "underwater" again in 2 months. This predictive capability may enable more accurate pricing in value deterioration risk when purchasing or selling loans.

The systems and methods of the present invention also incorporate Broker Price Opinions (BPOs) and actual appraisals. When new appraisal data is received from any number of sources, directly or indirectly, the valuation information may be incorporated into its index calculation. So if prevailing data would indicate one level of appreciation/depreciation, and actual appraisal values demonstrate a steeper or lesser rate of appreciation/depreciation, the index may be adjusted to reflect the new data. The systems and methods of the present invention may have an ability to learn as more data is incorporated to increases its predictive capability and accuracy.

The systems and methods of the present invention may incorporate multiple data sources. Data sources may include the previously prepared, predominant Case-Shiller Home Price Index, Federal Housing Finance Agency (FHFA) or Office of Federal Housing Enterprise Oversight (OFHEO) and Metropolitan Statistical Area (MSA) data, also from FHFA, as well as individual actual appraisals obtained through ongoing loan workout processes. Data sources may also include the National Association of Realtors, Trulia.com, and the combination of any or all Multiple Listings Service (MLS) organizations to increase the accuracy of the present invention. It is important to note that the most detailed information the invention leverages may be the underlying select comparable properties own recorded transaction valuations.

The systems and methods of the present invention may apply the most up-to-date market data of listing and sold prices not only for a given state or county or zip code, but for a selected level of locale and even individual properties specificity to provide the most accurate pricing given the available data and apply the most current and reliable data to asset valuations. In certain embodiments, every zip code in a given area may be analyzed to determine an appropriate mix of indices used for that given area. In these systems, all that may be required to obtain a current property valuation is an original appraisal value, original appraisal date, property type, and 5-digit zip code. With this information, the present invention can quickly produce valuation estimates for virtually an unlimited amount of homes. The invention may further add value by allowing for more specific attribute index valuations (i.e., bedrooms, bathrooms, size, etc).

The present invention may also take and apply the aforementioned data to any available futures statistics, where available, and may use regression and moving average trend analysis to provide additional information to predict future value out 1-12 or more months.

As indicated above, the systems and methods of the present invention may improve in accuracy over time, as shown in FIG. 4. This is where implementing actual appraisal data plays a role. Each time an appraisal is logged into the application, the present invention may determine how accurate the initial index was in predicting that particular value 401. Depending on the number of appraisals logged in that zip code and the extent to which there was an error, the present invention may adjust that particular zip code's index to reflect actual results. This may allow constant adaption to changing markets and may allow the systems and methods to become more accurate with each actual appraisal data point received.

Finally, based on the amount of data/data points for each location, confidence scores can be established to give the user an idea of how much weight to give the final valuation 403. A confidence score may be applied to each valuation on a scale. A high confidence score may mean that there are either an abundance of appraisals in that area or that the system has been extremely accurate in past predictions for this area.

Experimental Results: In terms of accuracy, the present invention was tracked with thousands of actual appraisals received. Thus far, the present invention has a 93% R-Squared with a 9% absolute average error when used to predict property values within a portfolio. These figures are statistically significant to a 1% level.

Figure 5:
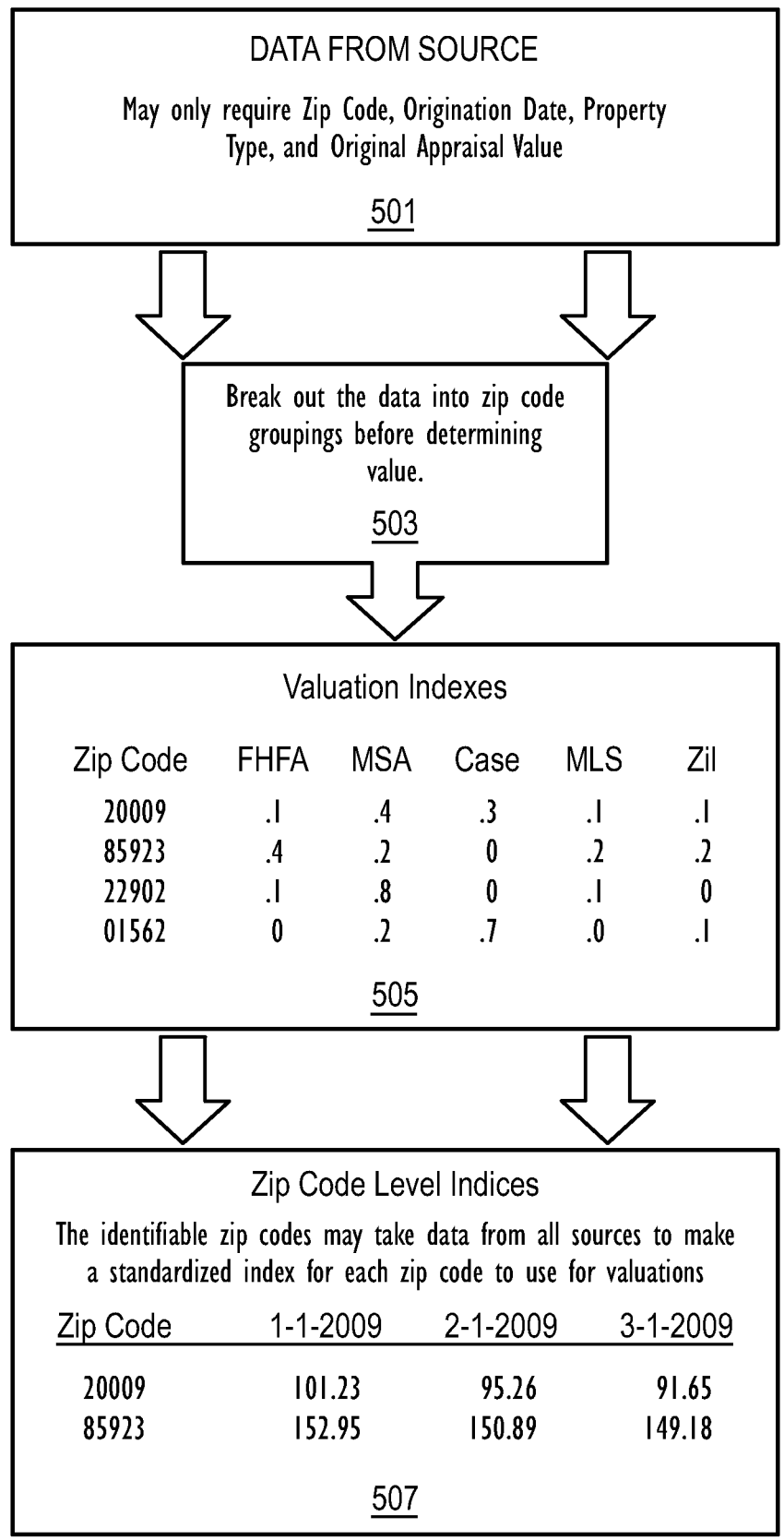
FIG. 5 shows a process for determining zip code level indices.

The systems and methods of the present invention may include a user-friendly platform and interface driven by programs such as Microsoft Excel, Access, SQL Server, Visual Basic Studio and .NET technologies and their market and product competitors. Based on an appraisal at some past date, the present invention can apply the percentage movement of the index over a period of time to obtain the current value of a home. Case-Shiller alone, however, is only representative of 40% of the country and is not accurate on a zip code level. A prime example of this would be evaluating real estate in Washington, D.C. using Case-Shiller data. Case-Shiller data not only tracks zip codes in Washington, D.C., but also incorporates zip codes from as far away as Baltimore, Md. into the index. Including repeat sales data from real estate markets this different can cause issues when trying to determine property level valuations. To enhance accuracy, an appropriate weighting of each data source mentioned above may be incorporated into every zip code in Washington, D.C. to create more realistic predictions, as shown in FIG. 5. The present invention may take information from a data source 501 before breaking the data into groupings based upon area 503. Data may include zip code, origination date, property type, original appraisal value, and other information. The result may be one or more valuation indexes for each zip code in a given area 505 based on sources and attributes. Due to the availability and suitability of multiple indexes and comparable property valuations, embodiments of the present invention may leverage data from one, some or all sources to make standardized indexes for each identifiable zip code to use for valuations in a zip code level index 507. And, the data may then be determined for various past, present and future sates and time periods. Future index values may be predicted by statistical trend analysis of the index of monthly value percentage changes, underlying values of the index of monthly value percentage changes, or other market indicators.

Unexpected results have occurred in areas where there exists little data on home price changes or current market conditions, or where certain property types' rate of appreciation/depreciation is higher or lower than other property types. For instance, there may be a home price rate of change in a town in Arizona of −25% from one month to the next. This figure could be misleading if the data included just a few sales of very expensive homes that are not that close to one another, or it may actually be an accurate proxy for the market if the data set was large enough. The present invention incorporates actual appraisal data and broker price opinions to adjust an index value to reflect new zip code level data. This means that the present invention has and incorporates data in areas where other indexes do not.

Another unexpected result is that index values and available data might indicate a 20% year over year decline in Miami property values. If single family homes held their value better than other property types, and condos actually fell 40% year over year, then an index could lead to an inaccurate predicted value. By incorporating actual appraisal data and BPOs and adjusting the index by geography and property type, the present invention may correct for this data reliability issue by offering more appropriate indexes to apply or choose from during analysis.

Loan Information Pricing System (LIPS)

Embodiments of the present invention may include a Loan Information Pricing System (LIPS). LIPS may be used for current mortgage quotes. LIPS may be a unique software bridge application designed to work between (1) secure server environments responsible for loan program and pricing engines (PPE) and/or (2) otherwise traditional desktop analytical and business productivity tools like Microsoft (MS) Office Suite, MS Internet Explorer browser and their competitors.

The present invention allows an end-user to perform potentially unlimited volumes of loan program eligibility and multi-variable pricings by bringing server-side features to the user desktop. LIPS may control the server-side applications and allow for the user to scale the speed and volume capacities for pricing transactions entirely or nearly entirely independent of the hosted pricing engine provider's own existing infrastructure and growth plan.

The present invention may reduce or eliminate the limiting performance dependence on a hosted PPE Software as a Service (SaaS) offering. The present invention may provide access to scale the end-user bulk pricing capabilities by dramatically increasing the speed, flexibility and usability of pricing results. The present invention may allow the user to substitute other available network resources and programming in place of the existing service provider assets. This is usually not possible or feasible due to the normal "lock-in" of the SaaS business model. The present invention can be configured to leverage the user's own local area network assets, such as servers, desktops, laptops, etc., by making them available to perform pricing. These additional resources may not be otherwise available to the PPE SaaS provider. The present invention may not be limited to local resources and may control wide-area resources including "cloud computing" assets for greater performance scale and cost-effectiveness.

The present invention may be employed by a PPE SaaS subscriber for its own direct consumption and benefit as described herein. It may be integrated as an enabling technology by the PPE provider to scale their own offering to subscribers. The present invention can also further replace the existing SaaS provider-to-subscriber market. The present invention may allow third-party application hosting service providers with available processing capacity to become virtual PPE network enablers (VPPENE). Additionally, the present invention may make it possible for the pure marketing of virtual PPE network operations (VPPENO). It may add scale where it does not currently exist, i.e., inside and outside the handful of available PPEs.

LIPS may be a mortgage pricing interface. As compared with property valuations, LIPS may interface with third party servers and databases to determine what mortgage products are available for a property and borrower with certain given characteristics. The present invention may include an interface that operates with third party servers and databases. A LIPS Upload format may run a macro in Excel that formats a pool of loans for upload into the LIPS interface.

Available PPEs offer the promise of the best and most accurate pricing by comparing all available and eligible programs and determining the best pricing for each loan submitted in a user interface. Because of the current limiting technical approach to bulk pricing, they do not offer the same depth of information and flexibility of choice when performing bulk loan pool pricing as they do for individual loans. Instead they offer a single best pricing per loan pool record (and discard the other many dozens of eligible program pricing information that is not deemed the best execution pricing at that time). Therefore, current bulk pricing practices may discard anywhere from 2-100 times the amount of information that is kept (assuming 2-25 potential investors and 1-4 potential loan programs to price). For example, there may be several investors offering equivalent pricings in a competitive market, or there may be multiple unique characteristics that are as important as price, but most of these are discarded and not available for consideration or later review.

To obtain the best pricing on a pool of 5,000 actual loans, a user may require the pricing of 100,000 loan scenarios due to the combinations of 5,000 loans and several other variables. For example, adding a parameter of ten choices would turn 5,000 loans into 50,000 unique scenarios requiring individual pricing transactions. Then, with the potential for up to twenty five investors and up to four programs each (whether they are eligible or not), this quickly multiplies into a potential unfiltered loan pricing set of 5,000,000 results. In this example, one bulk pricing job could burden a PPE system with the volume equivalent greater than a typical day's volume for all subscribers. For the offloading of the remote pricing to take place outside of the hosted PPE, each one of these 50,000 unique scenarios must be passed to the SaaS system to obtain the investor program and price for each. Thus, the result is 50,000 individual two-way transactions resulting in 5,000,000 records on the remote server. It would be more efficient if the 50,000 requests would be transmitted as one batch request, and that all of the results would be return as a single result set, as found in embodiments of the present invention.

The present invention may bypass the traditional market practice of a centralized SaaS graphical user interface (GUI) and brings many of the host PPE administrative functions and capabilities down to the end-user desktop. The user may have administrative control over the pricing job on the server(s), desktops, laptops, etc., and self-determination over the hardware resources that can be applied to improve performance and scale.

The present invention may allow a user to direct pricing jobs across one or more available application servers to achieve the fastest possible results, i.e., forced or adaptive load balancing. The available hardware need not be local, as the present invention provides for universal routing and balancing of pricing execution based on the user priorities and the available resources at the time the pricing job is submitted and as they change during the duration of the job.

For example, if it takes 8 hours to complete a bulk pricing job using the existing solutions on a given server, the present invention may allow the user to leverage 8 identical servers in a virtual parallel process to reduce the same to one hour. Depending on the user's needs and resources, they can leverage existing hardware, purchase compatible hardware or rent CPU time (a/k/a Cloud Computing). The present invention may also serve as a router for matching job allocations and available.

The present invention may perform tasks on many technical and functional levels, not just as a core PPE, and not limited to singular best pricing results per loan as today's offerings provide. The present invention may facilitate the user at the desktop level to automatically build a specific loan pool pricing job input table by accepting select loans and building the combinations of complex loan scenarios by offering multi-variable parameter selections. Choices or parameters include loan-to-value (LTV) percentages, credit scores, occupancy types and loan program and product types, amongst others. This may be how 5,000 actual loans become a 50,000 loan scenario pricing job. The present invention may profile the larger input table and sort and group comparable loans to construct an ordered table such that similar loan scenarios may be priced closer together in time to avoid SaaS mid-job pricing updates causing variances in expected identical results.

The GUI may provide for the user to choose from pre-formatted selections and/or to enter custom values. Examples may include a range of LTVs from a low to a high value in set incremental steps, perhaps from 50% to 95% in 5% steps, as well as 97% outside this sequence. The present invention may allow the user to not only establish these individual parameters, but also name and save the collection for later repeat execution whether for the same pool re-pricing, or for another pool job. The pricing process may take place at the user command, either on demand or as a scheduled event. Repeat re-pricings may also be scheduled.

The present invention may offer a differentiator from market PPE practice by providing for job prioritization not only before the job is initiated, but inline controls as well to accommodate newer, high priority jobs that may require additional resources to meet deadlines.

In another departure from current offerings, the use of the present invention may be role-based and paired with an authorized network User ID and can be enabled to send email notifications of job progress by job and by user and job role. The distinction here is that different users may execute pricing jobs and other interested parties may be notified regarding the loans and pools being priced. For example, John Smith may use the present invention to price a loan pool of Option-Arm product from Lender XYZ and the present invention can be configured to notify the user as well as the Option-Arm product specialist and the Lender XYZ relationship manager of the job being executed and when it is complete with summary results.

The present invention may govern and direct all server-side functions from clearing the inbound database table in preparation for the new job, to moving the new bulk loan pool job input table to the server, to clearing all prior parameter settings, to configuring the new job settings based on the user selections described above. Following the on demand and scheduled commands, the present invention may initiate each pricing job on the application server, as directed, and calculate and estimate time-to-completion using extrapolation across the job scope (total number of records) based on the cumulative number of records processed at each one minute interval. The estimated job completion time and countdown ticker may be re-evaluated and updated at one-minute intervals until 90% of the total records have been processed and then at a ten-second interval until finished. A job dashboard may offer role-based user visibility into current running job status as well as scheduled jobs. Additional objects on the dashboard may include available resources and utilization levels. Users may have access to previous job results. Because of the depth of quantitative results that can be generated and deleted by a PPE, the present invention may specifically allow the user to govern the depth of the best pricing execution levels for each scenario from one to five or more deep. The benefit is that the user with a 50,000 loan scenario job can have access to up to 250,000 qualitative results as needed as a fair balance between the time to re-price for more information (if only the single best price for 50,000 scenarios had been saved) versus the overall storage requirements if all 5,000,000 records were stored.

The present invention may bring together the multi-disciplinary best practices of the network router, print server, web server load balancing, optimal capacity utilization, contact-activities-time management software, just-in-time inventory management, role-based security and e-commerce high-availability and user-friendly interface standards. The present invention may also leverage the combination of technology and process management to disintermediate the current PPE SaaS business model along the lines that the wireless telecommunications industry has seen success with mobile virtual network operators (MVNO) and mobile virtual network enablers (MVNE). The present invention may create the opportunity for intermediate layers of hardware resource optimization and wholesale pricing and resale opportunities.

LIPS may allow existing large scale transaction processing systems to scale faster and less expensively by being inserted as a dynamic management and control application layer. Examples may include bond rating agencies, federal regulators, as well as government, corporate and any collateralized bond trading, risk management and portfolio analytics operation where valuation is a key driver in decision making.

Workout Activity Tracking System (WATS)

Embodiments of the present invention may include a Workout Activity Tracking System (WATS). WATS may be a unique software application and database platform that offers a dynamic user interface, drives business progress with a prescriptive and intelligent workflow and serves as a secure data warehouse and system of record for capturing, monitoring, measuring and reporting on the many moving parts of whole loan workout process. "Workout" means many different things to the different players in the mortgage pipeline, and the present invention may offer a new common platform that brings the various parties together to maximize recovery in loan value, asset value and to reduce execution risk. WATS offers direct hosting and integration of the RAPS and LIPS modules on a common and secure platform capable of real-time data movements, analysis and reporting.

The present invention may be available as a SaaS offering, a traditional hosted Application Service Provider (ASP) model, as well as an internal installed system whether for internal consumption or for use as a consulting asset.

The present invention may integrate manufacturing supply chain management philosophies, software development lifecycle planning; inventory management best practices, e-commerce efficiencies and scalability pioneered by peer-to-peer social networking tools. The present invention may allow for a shared platform that enhances value through transparency and real-time interaction. The present invention may offer high-performance and complementary tools sets and features that enhance the ability to measure and either accelerate or slow the turnover of loans in the mortgage industry depending on your business objectives.

The present invention may solicit and accept a combination of input sources from authorized end users to external public and private data sources. The present invention may track and report on aggregate and loan-level workout execution and servicing progress through the resolution process from boarding to borrower activities, application to appraisal, and underwriting to funding.

The present invention may offer transparency and accelerate execution by means of Aging Exceptions not only at the individual loan level, but also at the aggregate Workout Partner, or Lender, level where Partner loan officers, Partner managers and Service Providers can all see and collaborate on the same issues and opportunities.

The present invention may offer a user-friendly, web-browser interface with the information and tools necessary to initiate and manage a workout resolution through to completion. The technical platform integrates multiple technologies to offer the best available online experience as well as convenient PDF reports and Excel-based exports.

The present invention may incorporate multiple improvements over existing shared database or shared decision information software programs. These include the ability to track thousands of loans' progress from purchase through refinancing or some terminal process decision in one centralized online database using batch processing; economies of scale can also increase the computational speed for large numbers of loans. The present invention also may allow tracking multiple workout partners' progress with respect to their assigned loans nationwide. The present invention may provide a centralize interface for hundreds of loan officers to keep track of their own assigned loans, and make notes and updates as the loans progress towards some exit. The present invention may allow timely reporting to stakeholders.

The present invention may offer a single common platform where not only specialists (relationship managers, credit counselors, product specialists, underwriters, processors, closers, etc.) at one company can log in and see and contribute to the workout process of one or more loans, but also a limitless number of hands-on users can watch and facilitate workout progress as an extended team. By allowing or even forcing disparate players in the life of the loan workout to collaborate and congregate around the day-to-day activities that they influence or execute, the present invention may compress time and save effort to bring about increased turnover. Not only can the present invention streamline a multi-company process, but it may also increase transparency and, therefore, confidence.

The present invention may bring together dozens of new and disparate technologies to assemble a robust, proprietary Web 2.0 application riding on a dedicated Microsoft SQL Server data warehouse platform. It may be a secure, special-purpose communications and operations management hub offering real-time, dynamic intelligent inputs and outputs to the service provider for note holders, their partners, service clients and investors. It may be a many-to-many application offering that offers greater value than the traditional one-to-one. It may provide flexible business intelligence reporting capabilities across multiple data dimensions by pool, partner, investor and service client all down to the loan level.

The present invention user interface may divide major workflow tasks into pages, tabs and zones. Pages include an initial "My Loans" page where each individual only has access and visibility into their own loans assignments. A "Workout Activity Tracking" page may offer the ability to open multiple simultaneous loans in individual tabs to have immediate access. Each Tab may hold a consistent layout of unique zones that group data fields according to these current categories or functional areas such as, but not limited to: Borrower, Borrower FICO, Borrower Activity, Original Loan, Loan Documents, Property, Property Valuations, New Loan, Other Liens, Special Circumstances, Payoff & Variance, Milestones, etc. Other pages may include an online forum and/or user manual to facilitate the exchange of information, ideas and training and learning.

In particular, the present invention may offer an independent and integrated security application that governs all levels of access from each user login to individual loan-level access through to independent field-level security. This may allow the business owners and operators to maintain self-determination over access and real-time reporting.

The present invention may have an integrated security application that may govern all levels of access from user login to field-level security. This custom security toolset may be independent of the broader network security largely governed by Microsoft Active Directory (AD) or a similar system. For example, operators of the present invention may onboard a new employee and establish their AD user ID and profile with access to Outlook or a similar system, shared folders and files and other resources such as drives and printers, but that individual would still not have access to the present invention, as they would not yet have a user ID for the present invention. Furthermore, even a valid user ID and password may not grant access to any data with the present invention. Access to the data is a multi-step and multi-dimensional process and could proceed as follows (one example):

1. Obtain approval—Even before a new User ID is created, approval from Invention admin/manager is required.

2. Create new User ID—Creating new user IDs and overall access administration is the unique responsibility of the Invention administrator who must obtain the approval of management in order to establish new users by creating a new user ID and password.

3. Assign a Role—A named user must be granted one or more predetermined Roles—Roles include but are not limited to a User, Partner Lead, Partner Loan Officer Manager, Partner Loan Officer and Escalation Team. For example, only users that belong to the Variance Approver Role can approve a variance in the Invention. Partner Leads and Partner Managers can manage the loan-level access of the down-line Roles of Partner Loan Officer and Partner Operations. These last two bottom-level Roles may be different in name to help reflect the best practice that Loan Officers usually have select individual loans and Operations staff have all loans in order to be available to support any Loan Officer at a moment's notice.

4. Place in Partner hierarchy—Only after having a Role assigned to the new User ID may that User available in the Invention User Security module to be placed into one Partner hierarchy. A User can only belong to one Partner hierarchy. Therefore, individually-named Partner organizations must also be established before a User can access any data.

5. Grant access to loans—Only after a User ID is created, a Role may be assigned and a Partner hierarchy is established and properly aligned in the Security module, can individual loans be granted to a named user. At that time, the user can be identified as the Primary Loan Officer, which grants no special privileges in the present invention, but is useful for reporting purposes and supports the sense of ownership for loans and Borrower relationships.

6. Field-level control—The Administrator may have the ability to make individual field-level behavior modifications by making each field not visible, read-only, or editable.

7. Monitor by loan pool—A loan-level, loan pool structure may be in place to assist in organization and access execution. A loan may only belong to one pool, therefore it is easy to monitor, review and report not only on loan pool performance, but also on Partner and individual Primary Loan Officer assignments.

8. One-click control—While the security module and data architecture may require multiple people and process executions to grant a User access to one loan, it only takes one mouse click to remove said access by "un-authorizing" that individual. With that one action, the User may lose all access to the application, including login capabilities.

9. User hierarchy self-administration—Invention security module hierarchy may provide for down-line administration of Partner loan assignments. Partner Managers can move loans to and from Loan Officers as needed, but only loans have been granted to that Partner by the Invention Administrator.

10. Real-time Notifications—The present invention may have programmatic behavior where email notifications are sent to teams of involved/assigned Users when certain User actions take place. For example, if a User chooses to change a loan situation or status, a blast notification goes out immediately to administrator and managers. Similar behavior may exist for submitting and approving variances.

Figure 6:
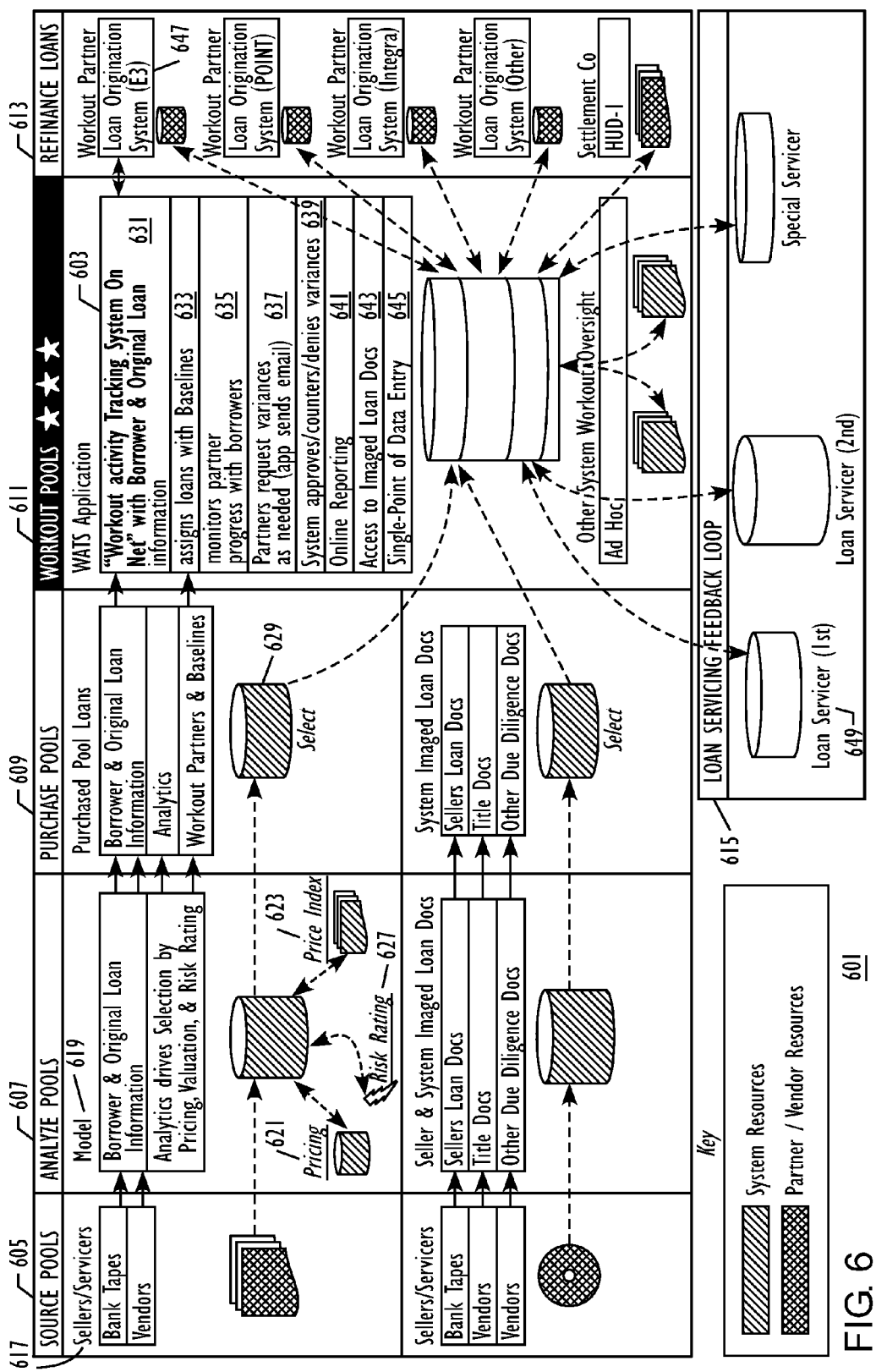
FIG. 6 shows an exemplary process for a workout data flow.

FIG. 6 shows an exemplary process for a workout data flow 601. The workout data flow 601 illustrates an exemplary use of the WATS application 603. The workout data flow 601 may include sourcing pools 605, analyzing pools 607, purchasing pools 609, workout pools 611, refinancing loans 613 and loan servicing feedback loops 615. Sourcing pools 605 may include gathering information from sellers and/or servicers 617. Analyzing pools 607 may include using a model 619 to select desired pools using borrower and original loan information, pricing, valuation and risk ratings. Analytics may use pricing 621, price index 623, and/or risk rating 627. Purchasing pools 609 may use borrower and original loan information, the results of the analyzing pools 607 step, and information from workout partners and baselines. The purchasing pools 609 may involve a selection process 629. In workout pools 611, the WATS application may perform functions as described above. For example, WATS may track loans with borrower and original loan information 631, assign loans with baselines 633, monitor partner progress with borrowers 635, process requests for variances as needed 637, approve/counter/deny variances 639, report 641, access imaged loan documents 643, and/or be a single point of data entry 645. Refinancing loans 613 may include communication with workout partners and related systems 647. Loan servicing feedback loops 615 may include communication with loan servicers and/or special servicers 649.

Integrated System

The above-described embodiments of the present invention may be available independently or fully integrated as an expandable product and method to meet complex and changing business needs. The present invention may include systems and methods for value-added analysis, administration and execution of asset valuation, whole loan pricing and inventory management. The present invention may offer diverse and competitive modular components as well as an integrated and innovative platform that does not exist in the market. The asset valuation tool may use multiple data sources to produce current and predicted future values along with historical and intermediate data points on the requested timeline. The loan information pricing tool may perform potentially unlimited volumes of loan program eligibility and multi-variable pricings by bringing server-side features to the user desktop. The workout activity tracking tool may be a software application and database platform that offers a dynamic user interface, drives business progress with a prescriptive and intelligent workflow and serves as a secure data warehouse and system of record for capturing, monitoring, measuring and reporting on the many moving parts of whole loan workout process including the direct hosting and integration of the asset valuation tool and loan information pricing tool.

Figure 7A:
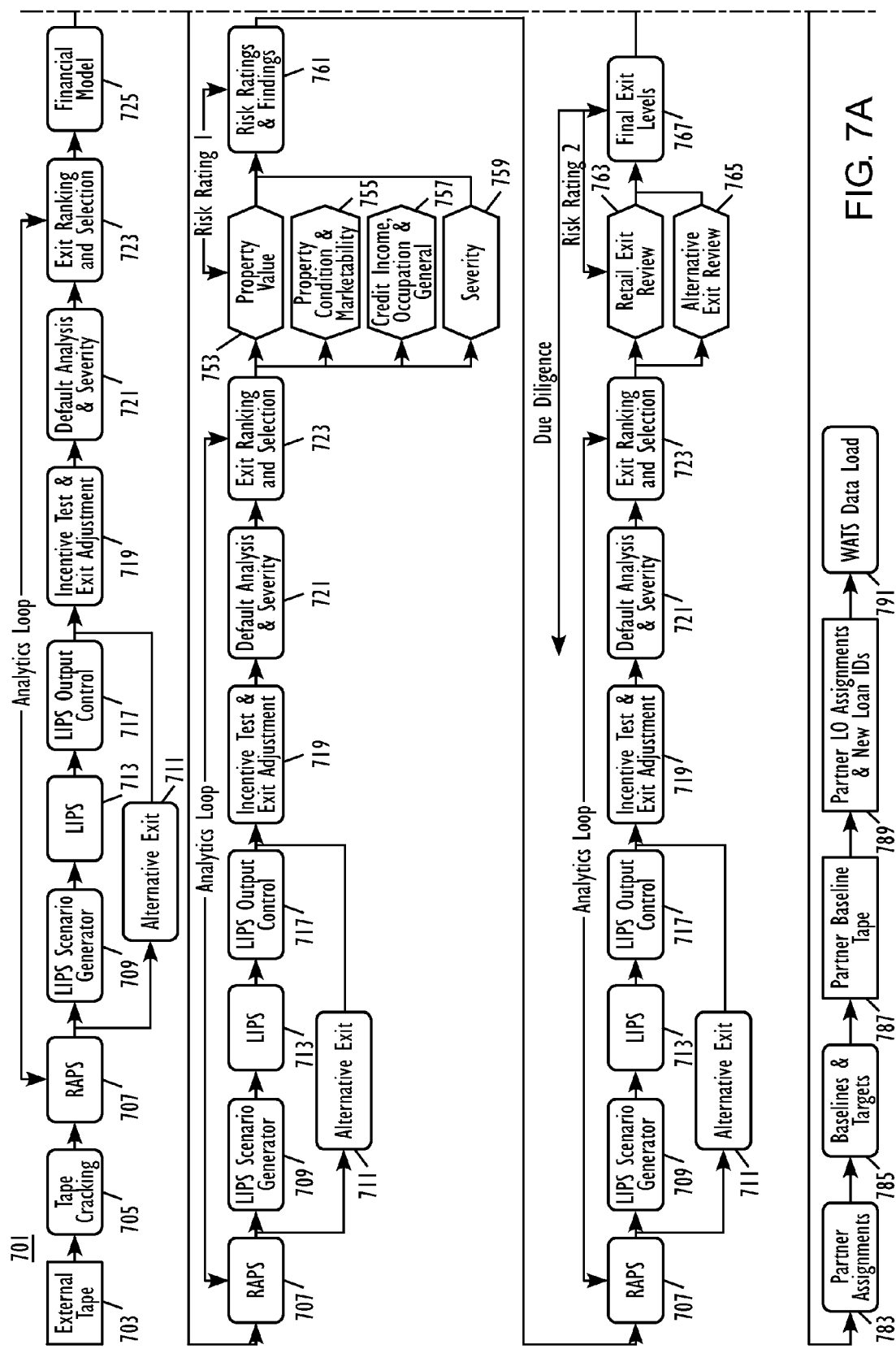
FIGS. 7A and 7B are an exemplary analytical process diagram.
Figure 7B:
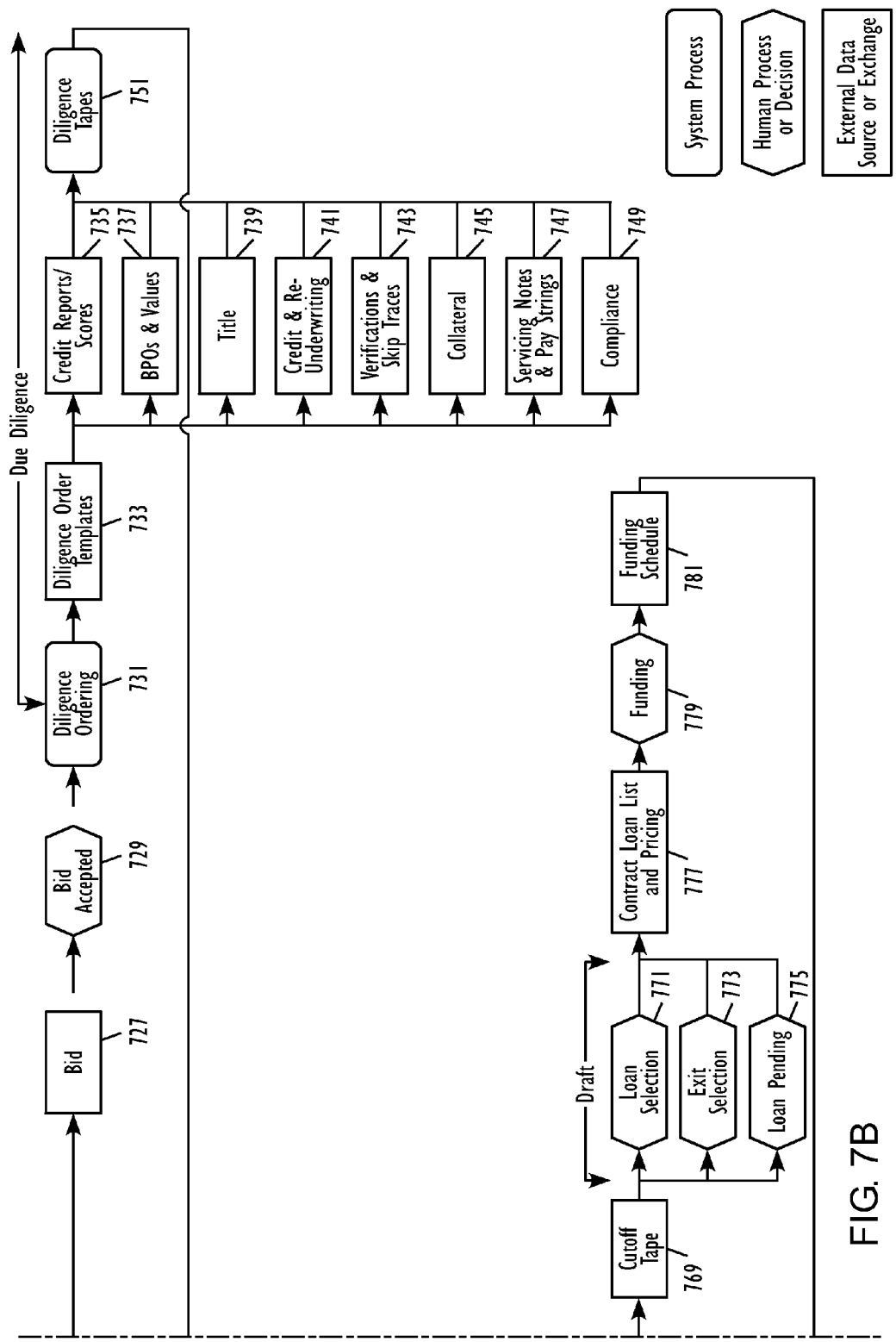

FIGS. 7A and 7B are an exemplary analytical process diagram 701. Data may be accessed from an external source 703, such as external tapes. The external tapes may be cracked and have information extracted 705. RAPS 707 may input data into a LIPS scenario generator 709 and/or an alternate exit 711, which may bypass LIPS 713 and LIPS output control 717. The output of LIPS or the alternate exit may be used in an incentive test and exit adjustment 719. Default analysis and severity 721 may follow, with exit ranking and selection 723. Financial models 725 may be employed. One or more bids 727 may be received and accepted 729. Diligence may be ordered 731 on the one or more bids 727 and a diligence template 733 may receive inputted information regarding credit report scores 735, BPOs and values 737, title 739, credit and re-underwriting 741, verification and skip traces 743, collateral 745, servicing notes and pay strings 747, and compliance 749. The results may be diligence tapes 751 that may be entered into RAPS 707 for an analytics loop. Risk rating may include property value 753, property condition and marketability 755, credit income, occupation and general information 757, and/or severity 759, which are then fed into a risk rating and findings 761. The results are then fed into RAPS for an analytics loop. Another risk rating may be performed including a retail exit review 763 and/or an alternative exit review 765 before final exit levels 767. A cutoff tape 769 supplies data for a draft, including loan solution 771, exit selection 773, and/or loan pricing 775. Contract loan list and pricing 777 may be provided for funding 779 and a funding schedule 781 may be received. Partner assignments 783 may be made with baseline and targets 785. Partner baseline tapes 787 and partner loan origination assignments and new loan identifications 789 may be received. Data may be entered into WATS 791.

Figure 8B:
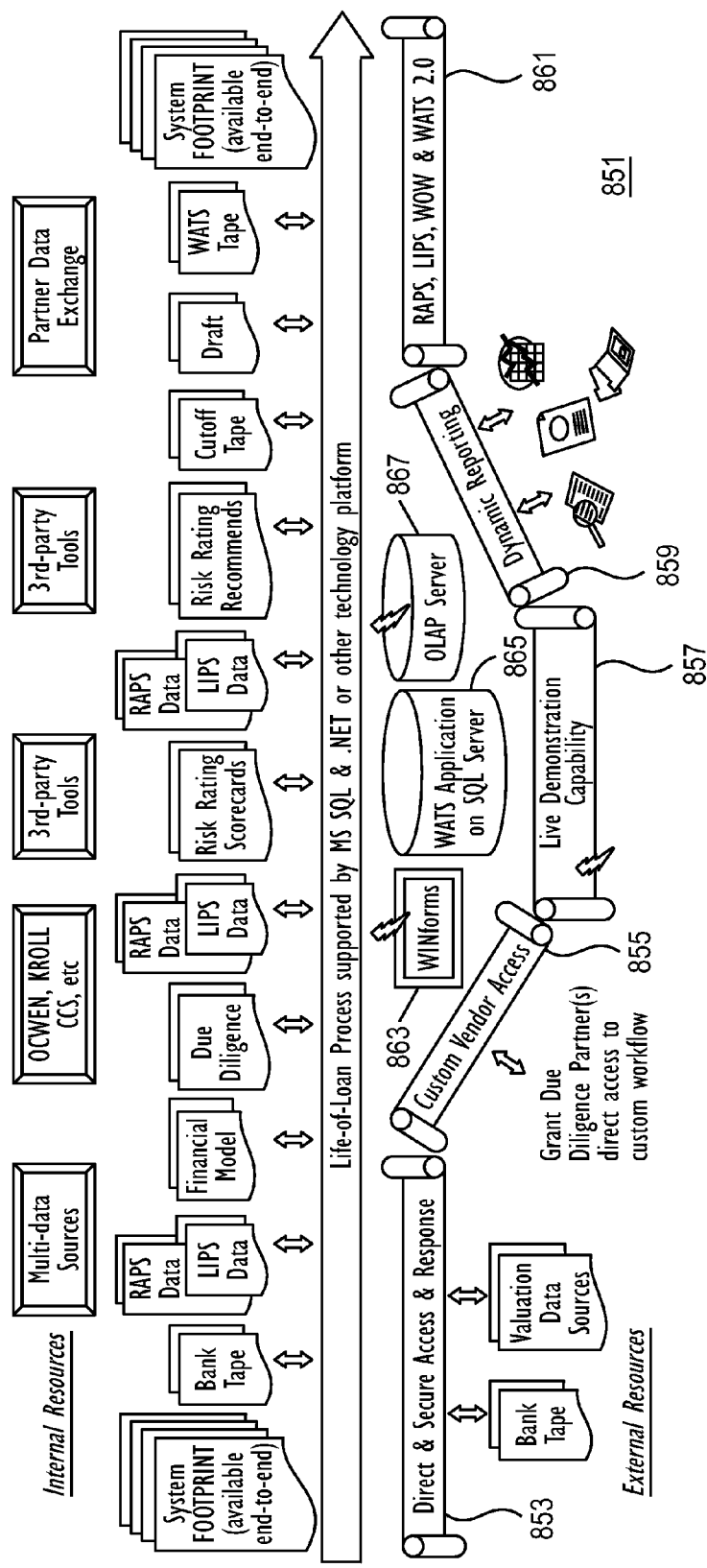
FIG. 8B is an analytical process diagram for an exemplary life of loan information system.

FIGS. 8A and 8B are analytical process diagrams for an exemplary workflow and life of loan information system, respectively. FIG. 8A is an alternate description of the subject matter of FIGS. 7A and 7B. As shown in FIG. 8A, a workflow 801 may process various pools in various phases. RAPS, LIPS and WATS may be used in various stages of the workflow to produce desired outputs 802. Data may be received as inputs 803 and may be prepared 805. An analytical loop 807 may use various sub-processes, such as RAPS, LIPS, and incentives. Models 809 may include financial models, risk rating, etc. Actions 811 may include bidding, responses, orders, property valuation, property condition and marketability, credit, severity, retail exit reviews, alternative reviews, etc. Outputs 813 may include due diligence tapes, risk ratings, tapes, etc.

As shown in FIG. 8B, for the life of loan information system 851, data definitions may be brought to the front to help define the process. The process may create new data and information and the process may evolve based upon the new data and information. The systems and method may include direct and secure access and response 853, custom vendor access 855, live demonstration capability 857, dynamic reporting 859, and access to RAPS, LIPS and WATS 861. Components may include WINforms 863, WATS application on an SQL or similar server 865, and/or an OLAP server 867. Data exchanged in the life of loan information system 851 may include those processes described in FIG. 8A, such as tapes, RAPS/LIPS data, models, due diligence, risk ratings, drafts, etc. Thus, the systems and methods of the present invention may provide value-added analysis, administration and execution of asset valuation, whole loan pricing and inventory management. The present invention may offer diverse and competitive modular components as well as an integrated and innovative platform that does not exist in the market.

The present invention may be a holistic, multi-tiered logical security platform incorporating internal and external checks and balances as well as transparency to metadata (loan assignments, partner hierarchy, etc.). The present invention may maintain controls to ensure data security as well as a centralized, one-stop point of administration to allow access with established logical controls to prevent an Administrator from making a mistake.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

What is claimed is:

1. A system for asset valuation, whole loan processing and inventory management, the system comprising:
   a processor;
   a memory operatively coupled to the processor, the memory comprising computer program instructions executable by the processor for operating modules comprising:
      an asset valuation tool using multiple data sources for producing current and predicted future values and historical and intermediate data points on a requested timeline, wherein the asset valuation tool produces the current and predicted future valuations on demand, and wherein the asset valuation tool performs the steps comprising:
         receiving a query from a user regarding an asset for valuation;
         accessing data related to the asset from a plurality of data sources, wherein the data includes at least a first index value for the asset, a second index value for the asset, and a first valuation value, wherein the first index value, the second index value and the first valuation value are actual values and not estimates;
         calculating an index of monthly value percentage changes from the first index value for the asset to the second index value for the asset;
         applying the index of monthly value percentage changes to the first valuation value to create a pattern of monthly valuation values based on actual property-level transaction data;
         projecting future index values by statistical trend analysis of the index of monthly value percentage changes, underlying values of the index of monthly value percentage changes, or other market indicators;
         calculating at least one future valuation using the future index values, wherein the future index values are related to the first index value or the second index value by application of one or more statistical methods;
         applying trend and growth statistical analysis using the future index values; and
         presenting the at least one valuation value for the asset to the user responsive to the query;
      a loan information pricing tool for performing unlimited volumes of loan program eligibility and multi-variable pricings on a user desktop; and
      a workout activity tracking tool for capturing, monitoring, measuring and reporting on a loan workout process including direct hosting and integration of the asset valuation tool and the loan information pricing tool.

2. The system of claim 1, wherein the plurality of data sources are variable public resources, private resources, and combinations thereof.

3. The system of claim 1, wherein the plurality of data sources include market estimates.

4. The system of claim 1, wherein the plurality of data sources include broker price options, actual appraisals, and populations of individual property valuations and estimates.

5. The system of claim 1, further comprising calculating a confidence score for the at least one valuation value.

6. The system of claim 1, wherein the data further comprises original appraisal value, original appraisal date, property type and zip code.

7. The system of claim 1, wherein the data further comprises identifiable zip codes.

8. The system of claim 1, wherein the data further comprises zip code level indices.

9. The system of claim 1, wherein the loan information pricing tool executes steps comprising:
   interfacing with one or more third party servers;
   interfacing with a plurality of databases in communication with the one or more third party servers;
   interfacing with one or more client devices;
   formatting a pool of loans;
   providing a plurality of parameters for loan pricing to the one or more client devices;
   receiving a selection from the one or more client devices of one or more of the plurality of parameters;
   processing the pool of loans based upon the one more of the plurality of parameters; and
   providing loan pricing for the pool of loans to the one or more client devices.

10. The system of claim 9, further comprising load balancing between the processor and the one or more client devices.

11. The system of claim 9, further comprising grouping individual loans within the pool of loans during processing based upon similar characteristics of the individual loans.

12. The system of claim 9, further comprising prioritizing co-pending tasks from multiple client devices.

13. The system of claim 1, wherein the workout activity tracking tool executes steps comprising:
   interfacing with one or more client devices;
   interfacing with vendor systems;
   accepting a query from the one or more client devices regarding the loan workout;
   tracking the status of the loan workout;
   receiving input from the vendor systems regarding the status of the loan workout;
   updating the status of the loan workout based upon the input from the vendors;
   providing logical controls to prevent mistakes during the loan workout; and
   reporting the status for the loan workout to the one or more client devices in response to the query.

14. The system of claim 13, further comprising providing access security for controlling access to the status of the loan workout.

15. The system of claim 1, wherein the workout activity tracking tool is a dynamic user interface with a prescriptive, intelligent workflow.

16. The system of claim 1, wherein the workout activity tracking tool serves as a secure data warehouse.

17. The system of claim 1, wherein the future index value and a second index date are related mathematically using statistical methods giving more weight to a future contract the closer it is in time.

18. The system of claim 1, further comprising updating the second index value based on receipt of actual appraisals.

19. The system of claim 1, wherein the data consists of zip code, origination date, property type and original appraisal value.

20. The system of claim 19, wherein the data is broken out by zip code before determining values.

21. The system of claim 1, wherein the data sources are public data sources scrubbed for inconsistencies and data errors.

22. A system for asset valuation, whole loan processing and inventory management, the system comprising:
- a processor;
- a memory operatively coupled to the processor, the memory comprising computer program instructions executable by the processor for operating modules comprising:
  - an asset valuation tool using multiple data sources for producing current and predicted future values and historical and intermediate data points on a requested timeline, wherein the asset valuation tool performs the steps comprising;
    - receiving a query from a user regarding an asset for valuation;
    - accessing data related to the asset from a plurality of data sources, wherein the data includes at least a first index value for the asset, a second index value for the asset, and a first valuation value;
    - calculating an index of monthly value percentage changes from the first index value for the asset to the second index value for the asset;
    - applying the index of monthly value percentage changes to the first valuation value to create a pattern of monthly valuation values based on actual property-level transaction data;
    - projecting future index values by statistical trend analysis of the index of monthly value percentage changes, underlying values of the index of monthly value percentage changes, or other market indicators;
    - calculating at least one future valuation using the future index values, wherein the future index values are related to the first index value or the second index value by application of one or more statistical methods;
    - applying trend and growth statistical analysis using the future index values; and
    - presenting the at least one valuation value for the asset to the user responsive to the query;
  - a loan information pricing tool for performing unlimited volumes of loan program eligibility and multi-variable pricings on a user desktop, wherein the loan information pricing tool performs the steps comprising;
    - interfacing with one or more third party servers;
    - interfacing with a plurality of databases in communication with the one or more third party servers;
    - interfacing with one or more client devices;
    - formatting a pool of loans;
    - providing a plurality of parameters for loan pricing to the one or more client devices;
    - receiving a selection from the one or more client devices of one or more of the plurality of parameters;
    - processing the pool of loans based upon the one more of the plurality of parameters; and
    - providing loan pricing for the pool of loans to the one or more client devices; and
  - a workout activity tracking tool for capturing, monitoring, measuring and reporting on a loan workout process including direct hosting and integration of the asset valuation tool and the loan information pricing tool, wherein the workout activity tracking tool performs the steps comprising:
    - interfacing with one or more client devices;
    - interfacing with vendor systems;
    - accepting a query from the one or more client devices regarding the loan workout;
    - tracking the status of the loan workout;
    - receiving input from the vendor systems regarding the status of the loan workout;
    - updating the status of the loan workout based upon the input from the vendors;
    - providing logical controls to prevent mistakes during the loan workout; and
    - reporting the status for the loan workout to the one or more client devices in response to the query.

* * * * *